Dec. 20, 1955

T. O. SUMMERS, JR 2,727,393

GYROSCOPE STARTING DEVICE

Filed Dec. 6, 1952

THOMAS O. SUMMERS, JR.
INVENTOR.

BY R. E. Geauque

ATTORNEY

Fig. 3.

Dec. 20, 1955 T. O. SUMMERS, JR 2,727,393
GYROSCOPE STARTING DEVICE
Filed Dec. 6, 1952 6 Sheets-Sheet 4

THOMAS O. SUMMERS, JR.
INVENTOR.

BY R. E. Geauque

ATTORNEY

Dec. 20, 1955

T. O. SUMMERS, JR 2,727,393

GYROSCOPE STARTING DEVICE

Filed Dec. 6, 1952

THOMAS O. SUMMERS, JR.
INVENTOR.

BY R. E. Geangue

ATTORNEY

United States Patent Office 2,727,393
Patented Dec. 20, 1955

2,727,393

GYROSCOPE STARTING DEVICE

Thomas O. Summers, Jr., Sherman Oaks, Calif.

Application December 6, 1952, Serial No. 324,591

20 Claims. (Cl. 74—5.7)

This invention relates to gyroscopes, and more particularly to gyroscopes of the quick-starting type. Such gyroscopes are commonly used in torpedoes and missiles where very little warning of an approaching target is given and where the gyro must be ready for operation immediately. Heretofore it has been necessary to allow the gyro rotor to attain operating speed before firing of the missile or torpedo was possible.

By the present invention, it is proposed to provide a gyroscope in which the rotor can attain full operating speed quickly. To bring a gyroscopic rotor to its operating speed in a matter of seconds requires considerable current, and the conventional slip rings employed to lead current to the gyro rotor do not have the necessary current-carrying capacity for fast starting. In gyroscopes for missiles and torpedoes it is expedient to employ a caging device to uncage the gyro simultaneously with the firing of the missile, which, of course, should not be fired until the gyro has attained operating speed. Thus it may be seen that during the time the gyro rotor is attaining its full operating speed the gyro proper will be caged and will not be uncaged until the rotor has attained its operating speed.

The present invention seeks to provide auxiliary contacts on the caging mechanism to lead current directly to the gyro rotor during the starting period. These auxiliary leads to the motor may be heavy duty inasmuch as they are disconnected and cannot cause the gyro to precess after uncaging. During caging, only a portion of the current to the gyro rotor is conducted through the regular gyro slip rings, while the major portion of the current is bypassed through the auxiliary conductors attached to the caging device. After the gyro rotor has attained its normal operating speed and is uncaged, the regular slip rings lead current to the gyro rotor, but this current is low and will not damage the low-friction slip rings as would the heavy starting current that is required to bring the gyro rotor up to speed quickly.

In order to accomplish the caging of the gyroscope, a caging means operates on both gimbals of the gyroscope to forcibly move the gyroscope into a caged position. It is provided that the auxiliary contacts are carried by this caging means so that they can not be moved into operative position until the gyro has been caged and, therefore, it is impossible to damage the device by improper movement of the auxiliary contacts. Since the caging means can quickly cage the gyro, the auxiliary contacts will become operative immediately to bring the rotor up to speed. Also, when it is desired to uncage the gyro prior to the movement of its carrying craft, the auxiliary contacts can be moved out of operating position along with the caging device so that the contacts will not interfere with the future operation of the gyroscope in controlling the movement of the craft.

It is, therefore, an object of this invention to provide novel means for quickly bringing the gyro up to speed while in the caged position, and thereafter maintaining the speed of the rotor through the normal slip rings.

Another object of the invention is to provide caging means for quickly caging and uncaging the gyro and, at the same time, positioning auxiliary contacts for the gyroscope.

A still further object of the invention is the provision of auxiliary contacts of low electrical resistance which become operative to supply a large amount of power to the gyro motor when the gyroscope is in the caged position in order to bring the motor up to speed.

Another object of the invention is to provide a caging device which can be selectively actuated by an operator and placed in caging or uncaged position without careful attention of the operator.

These and other objects of the invention not specifically enumerated above will become readily apparent from the following specifications and drawings in which.

Figure 1:
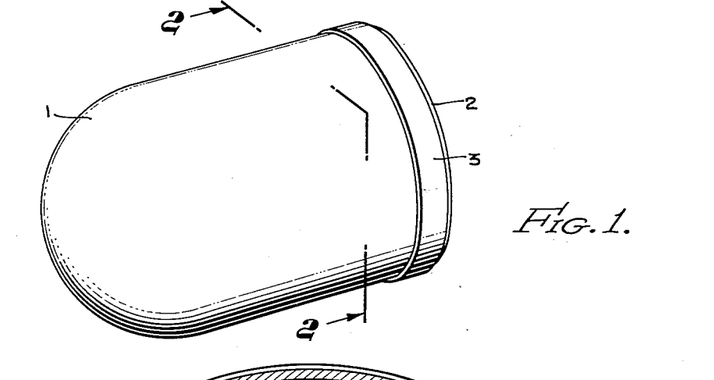
Fig. 1 is a perspective view of the gyro starting device of this invention illustrating the casing for the device.
Figure 2:
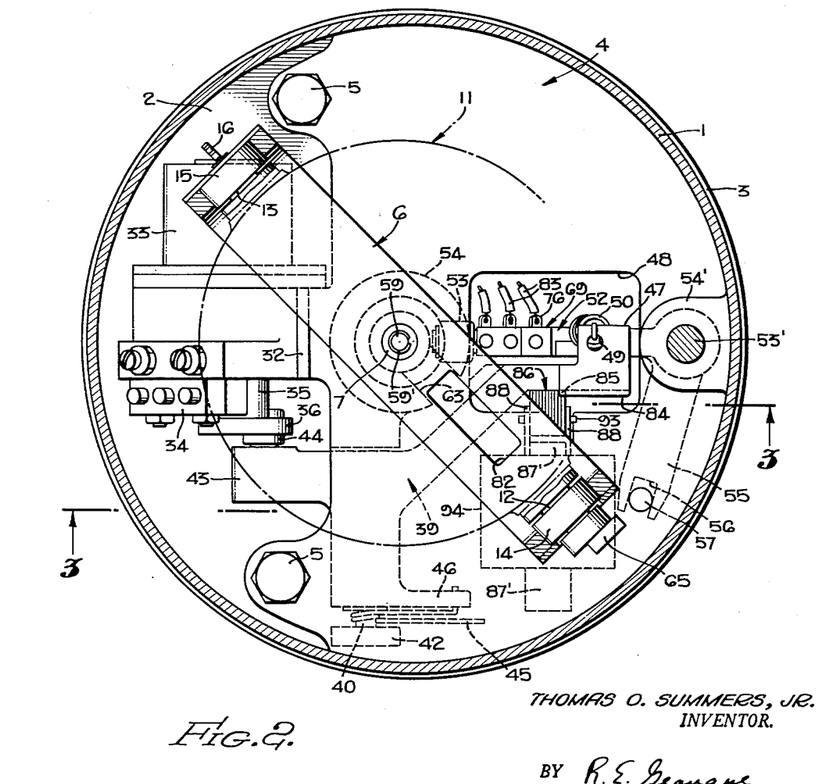
Fig. 2 is a vertical sectional view taken along line 2—2, Fig. 1, and illustrates the caging motor.
Figure 7:
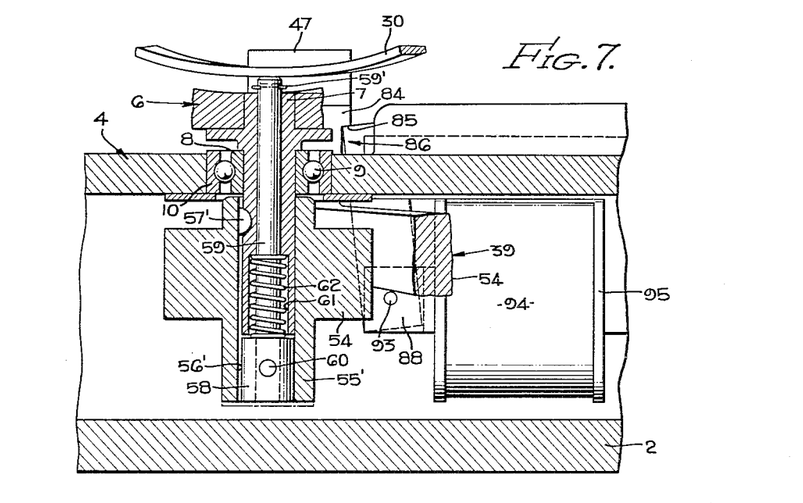
Fig. 7 is a cross sectional view taken along line 7—7 of Fig. 4 illustrating the caging plunger movable with the caging cam in its positions before and during the movement of the outer gimbal.
Figure 8:
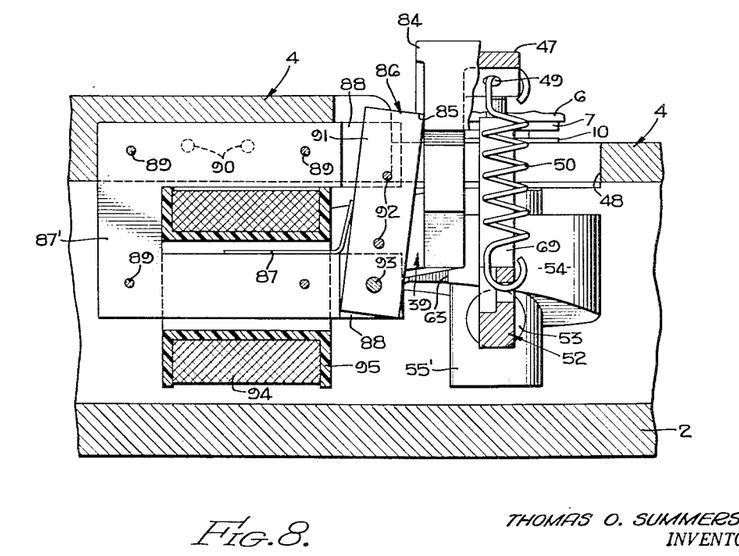
Fig. 8 is a sectional view taken along line 8—8 of Fig. 4 and illustrates the uncaging solenoid.

The embodiment of the invention chosen for illustration is enclosed in a casing 1 which is dome shaped and closed at one end by a cover 2. A band 3 passes around the end of the casing and the cover in order to hold these members together and hermetically seal the inside of the casing. A supporting member 4 is placed transverse of the casing and is held in position by screws 5. This member has openings for receiving various components of the invention later to be described. A gyrovertical is positioned within the casing and has its outer gimbal 6 pivotally mounted at one end in an opening in supporting member 4. The shaft 7 (see Fig. 7) is rigidly secured to the outer gimbal and passes through the inner race 8 which, together with ball bearings 9 and outer race 10, form one of the pivotal supports for the outer gimbal. The outer gimbal also has a similar support (not shown) at its other side so that the outer gimbal is free to move relative to the casing.

The inner gimbal 11 is pivotally mounted on the outer gimbal 6 about an axis at right angles to the pivotal axis of the outer gimbal. The shafts 12 and 13 for the inner gimbal are supported by bearings 14 and 15 respectively mounted in the outer gimbal, and each of the shafts projects beyond the outer gimbal. The shaft 13 carries three slip rings 16 on the outside of the outer gimbal, and three brushes 17 continue to bear against rings 16. Three leads 18 connect slip rings 16 with a second set of slip rings 16' located on the outer gimbal axis so that leads 18 can move with the outer gimbal. Leads 19 connect with rings 16 and pass through shaft 13 and the outer gimbal to the contact plates 20 which are, in turn, connected with the gyro motor 21' inside the inner gimbal by leads 21. The leads 18 carry the usual three-phase power supply for the gyro motor and, thus, it is possible to have the power supply pass through the outer gimbal to the inner gimbal regardless of the position assumed by the motor relative to the craft. This power supply has the usual high resistance encountered in slip ring connections of this type and is, therefore, incapable of carrying sufficient current to bring the gyro motor quickly up to speed. With the gyrovertical mounted in the manner which has been described, the gyro is capable of controlling its mounting craft during its movement.

Since the gyro rotor cannot be supplied with sufficient power through leads 18 to bring the rotor up to speed quickly, a first set of three contacts 22 are mounted on a band 23 which passes around the inner gimbal 11 and are secured thereto by means of screws 24 and bracket 25. The bracket 25 is made of Bakelite or some other type of insulating material and has three step surfaces 26 which are curved to mount the curved contacts 22. The band 23 has a groove 27 which receives projection 28 of bracket 25 to allow the bracket to lie flat along the band and help to retain the bracket 25 in position on the band. One end of each of the contacts 22 projects beyond the bracket 25 and the ends are utilized to connect with leads 29 which pass to contact plates 20 so that three-phase power can be supplied to the gyro motor from the contacts 22. Because these contacts are of substantial size, they are capable of carrying a considerable amount of electrical energy to the motor, and these contacts cooperate with other auxiliary contacts to form the starting circuit for the gyro motor. A circular caging ring 30 passes around the inner gimbal and is secured thereto by means of screws 31. This ring is symmetrical about the axis of the outer gimbal and comprises one element of a brake, which will later be described, for holding the inner gimbal when the outer gimbal is moved to cage the gyro.

Since the auxiliary contacts which cooperate with contacts 22 to start the gyro motor are moved upon caging of the gyroscope, the means of caging the gyro will now be described. The support member 4 has a right angle plate 32 integral therewith which serves to support the caging motor 33 and the switch 34. The motor has a shaft 35, and a circular disc 36 is mounted off-center on the end of this shaft. This disc carries a pin 37 which is likewise off-center from shaft 35 and, in one of its positions, it will actuate the plunger 38 of switch 34. An arm 39 is pivotally mounted on a shaft 40 which is supported at one end by projection 41 secured to supporting member 4 and at the other end by member 42 likewise secured to member 4. One end 43 of arm 39 carries a roller 44 and this roller is continually urged into contact with disc 36 by spring 45 which is coiled around shaft 40 and has one end pushing against projection 46 on arm 39. Thus, it will be seen that as motor 33 drives the disc 36, the opposite end 47 of the arm 39 will be moved back and forth. The supporting member 4 is supplied with an enlarged opening 48 so that the member 4 will not interfere with the movement of the end 47. The end 47 has an opening 49 which receives one end of a coil spring 50, and the other end of this coil spring is secured in opening 51 in caging arm 52. This caging arm carries a shaft 53' which passes through an opening in cylindrical projection 54' of supporting member 4. Also, the caging arm has a guiding arm 55 which has a groove 56 at its end to receive guiding pin 57.

Figure 3:
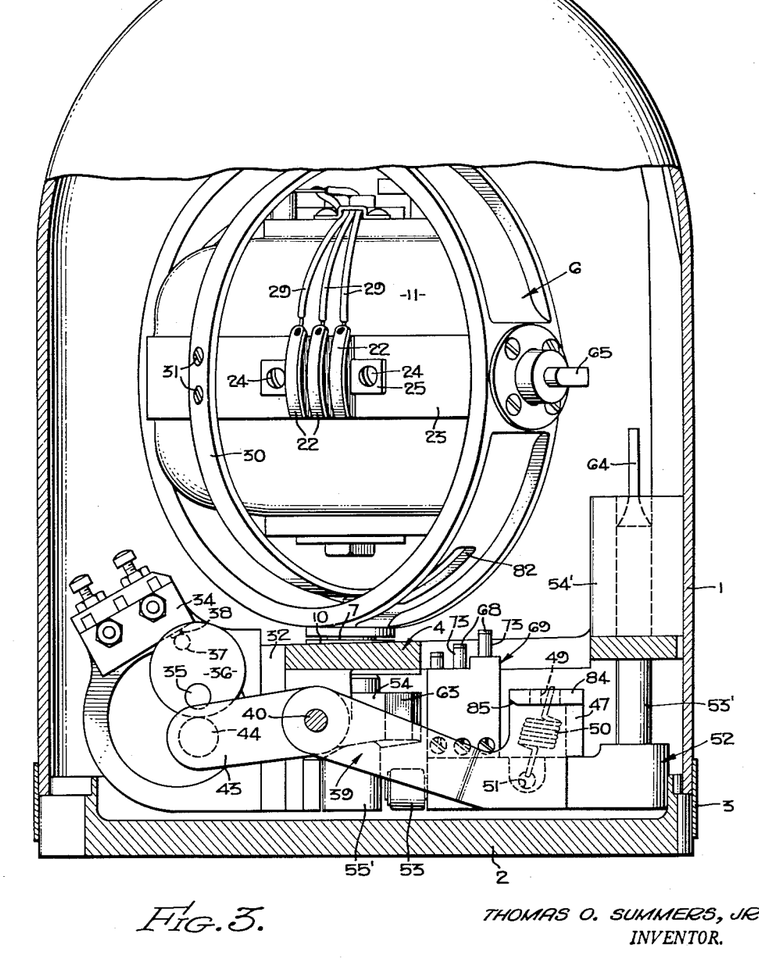
Fig. 3 is a horizontal sectional view along line 3—3 of Fig. 2 showing the caging device in uncaged position with respect to the gyroscope.
Figure 4:
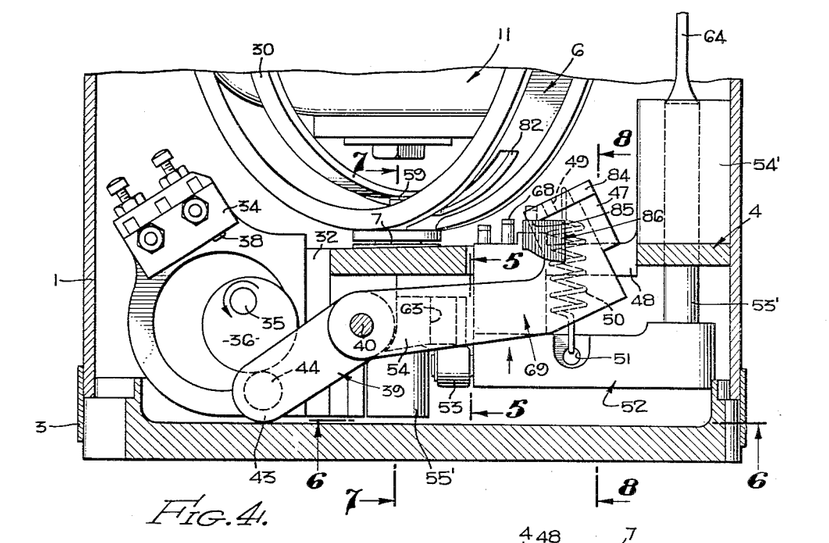
Fig. 4 is a horizontal sectional view similar to Fig. 3 illustrating the caging device in the position assumed to move the outer gimbal of the gyroscope.
Figures 5, 6:
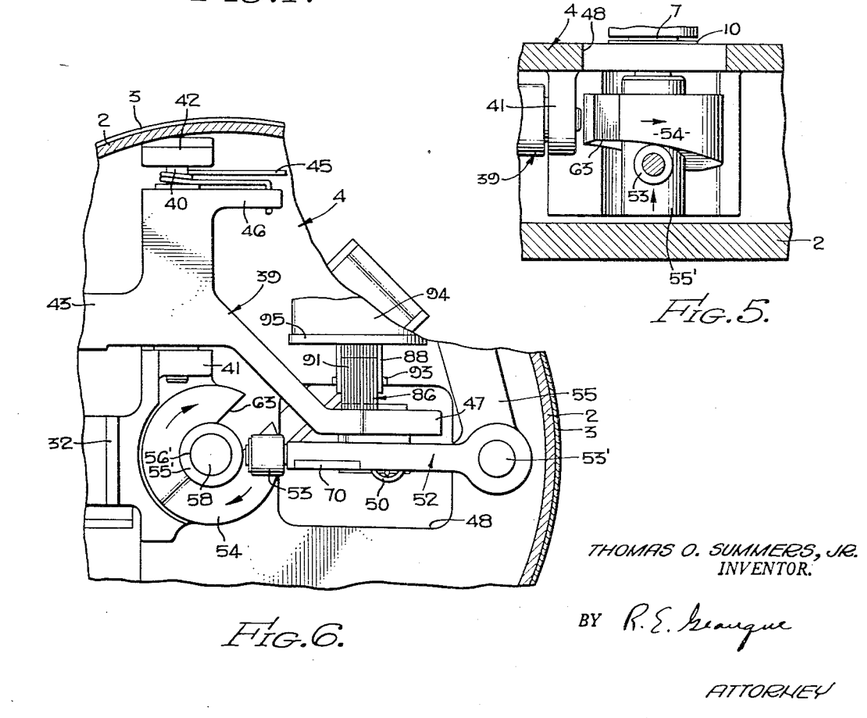
Fig. 5 is a sectional view along line 5—5 of Fig. 4 showing the caging cam and its direction of movement with respect to the cam roller.
Fig. 6 is a vertical sectional view taken along line 6—6 of Fig. 4 illustrating the caging operation.

It will, therefore, be seen that when the pin 37 is in the position closest to switch 34, spring 45 will cause the roller 44 to contact disc 36 and end 47 of arm 39 to bear against caging arm 52 as illustrated in Fig. 3. However, when disc 36 is rotated so as to move roller 44 a maximum distance against spring 45, the spring 50 connecting end 47 with caging arm 52 will cause the caging arm to be spring biased toward its caging position in the manner illustrated in Fig. 4. A roller 53 is carried by a shaft projecting from one end of caging arm 52, and when the arm 52 is spring biased, this roller is forced against the surface of caging cam 54. This caging cam is integral with a cylindrical member 55' which receives shaft 7. The member 55' has a groove 56' which receives a key 57' carried by shaft 7 so that member 55' is slidable relative to shaft 7. The end of member 55' is closed by a cylindrical plug 58 which receives one end of caging plunger 59 passing through a center opening in shaft 7. A pin 60 passes through member 55' and plug 58 and the end of plunger 59 to secure the plunger to cylindrical member 55'. Shaft 7 has an enlarged opening 61 at its end for receiving a coil spring 62 which passes around the plunger 59. One end of the spring bears against plug 58 and the other bears against the interior end of the opening 61 so the spring 62 continuously biases the end of plunger 59 away from caging ring 30. A snap ring 59' limits the amount of movement of the plunger under the influence of spring 62.

When the roller 53 is forced against the surface of cam 54, it will cause the cam to rotate so that the slot 63 in the cam will approach roller 53. The pressure of roller 53 on cam 54 will, likewise, position plunger 59 into contact with ring 30 as illustrated in the full line position of Fig. 7. Since the shaft 7 is keyed to cam 54, this rotation of the cam will also rotate shaft 7 and the outer gimbal ring connected thereto toward its caged position. The plunger 59, by its frictional force against ring 30, will tend to prevent the inner gimbal from precessing while force is being applied to the outer gimbal to move it to its caged position. When the roller 53 enters the slot 63 in the cam, the outer gimbal will be caged and this will allow the caging arm 52 to be moved by the spring 50 until it eventually strikes the under surface of supporting member 4, which position corresponds to the full line illustrated in Fig. 9. With the arm 52 in this position, the caging cam 54 is locked by roller 53 against rotation, thereby locking the outer gimbal in caged position and at the same time the pressure on plunger 59 is released so that the end of the plunger can move away from caging ring 30.

Figure 9:
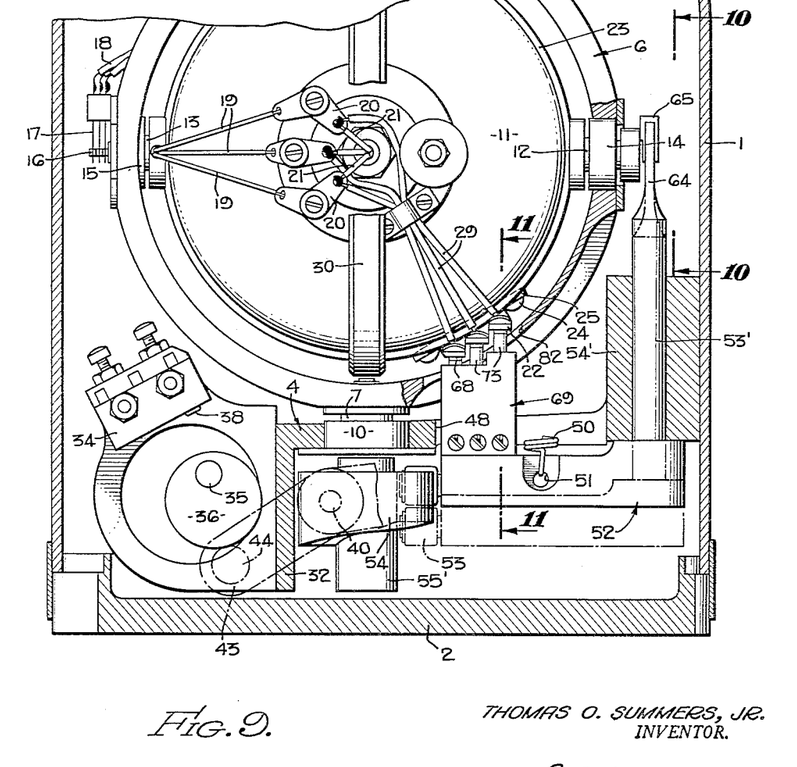
Fig. 9 is a horizontal sectional view illustrating the gyroscope in caged position with the auxiliary contacts in position to supply power to the gyro rotor.
Figure 10:
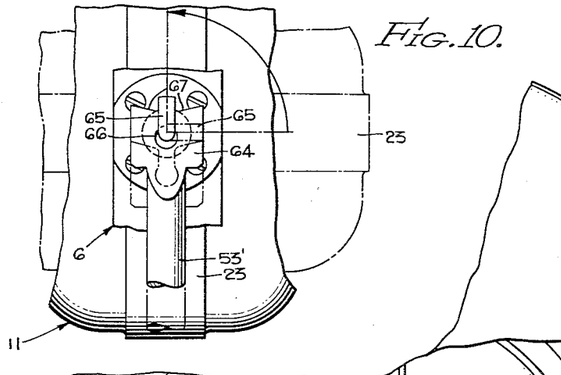
Fig. 10 is a view taken along line 10—10 of Fig. 9 showing various positions of the cam device used to position the inner gimbal.

When the arm 52 moves into the position shown by the dashed lines of Fig. 9, the end 64 of shaft 53 will engage the lug 65 carried by the end of shaft 12 which projects to the outside of the outer gimbal 6. The end 64 has a slot 66 and slanted end sections 67. If the lug 65 is not in line with the shaft 63, as occurs when the inner gimbal is out of caged position, the slanted portions 67 will engage the lug in the manner illustrated by the dashed lines of Fig. 10 and, because of the force of spring 50, will turn the lug 65 until it falls into slot 66. The inner gimbal will thereafter be held in its caged position so long as caging arm 52 is in the full line position shown in Fig. 9. Thus, it will be seen that when the end 47 of the arm 39 is raised into opening 48, the roller 53 will engage the cam 54 and rotate the outer gimbal into caged position and, at the same time, hold the inner gimbal against precession because of pressure exerted on plunger 59. When the roller 53 enters the slot 63 in the cam, the outer gimbal becomes locked in caged position and the inner gimbal is no longer held against precession so that end 64 is free to move the inner gimbal into caged position and lock it in such position.

Caging arm 52 mounts a second set of three auxiliary contacts 68 for movement with the arm 52. The contacts are carried by a stepped Bakelite member 69 which has a projection 70 lying along the arm 52. Screws 71 pass through projection 70 and arm 52 in order to mount member 69. Each of the contacts 68 has one end inserted in an opening 72 in the upper end of a plug 73, and each of these openings (only one of which is shown) likewise contains solder material 74 for connecting one end of leads 75 to the contacts 68. The other end of each lead 75 is soldered to a contact plate 76 which is inserted in a circular opening 77 positioned transverse of member 69. Each contact plate 76 has a ledge 78 which bears against one side of member 69 and ends 79 of the three plates 76 are bent over to secure the plates within the openings 77. The plugs 73 are slideable within openings 80 in member 69 and coil springs 81 are inserted in the ends of these openings to bias the plugs 73 against the leads 75, which leads serve to retain the plugs in the openings. Thus it will be seen that the contacts 68 are free to move toward member 69 without causing injury to the contacts.

The outer gimbal ring 6 has an opening 82 which is properly positioned to receive the contacts 68 when the outer gimbal ring has been caged. As the roller 53 moves into slot 63, the end 64 will engage lug 65 and will hold the contacts 68 away from contacts 22 until such time as the lug 65 moves into slot 66. At this time the inner gimbal will have been caged and the contacts 22 will be in proper position to receive the contacts 68. The position of the arm 52 in Figure 9, illustrated by the dashed line, corresponds to the condition where end 64 has engaged lug 65, while the full line position of the arm 52 corresponds to its position when the inner gimbal has been caged and the contacts 68 have moved through opening 82 and into engagement with contacts 22.

It is therefore apparent that when the gyro is completely caged, the contacts 22 will be positioned behind opening 82 so that contacts 68 can move with the caging arm 52 into engagement therewith. Three leads 83 connect with the three plates 76 in order to supply three-phase electrical power to the contacts 68, and since the contacts 68 are relatively large it is possible to supply a substantial amount of power through contacts 68 to contacts 22 and thence to the gyro motor. It will therefore be apparent that while the gyro is in the caged position it can be brought up to speed very quickly by energy supplied through a circuit having large current carrying capacity without the danger of damaging the usual slip ring connection to the motor.

The end 47 of arm 39 has a ledge 84 with a slanting surface 85. When the end 47 of arm 39 is moved to its maximum position through opening 48, the armature 86 will move under slanting surface 85 and retain arm 47 in this position against the force of springs 50 and 45. As end 47 moves through opening 48, the armature 86 will be biased by spring 87 against ledge 84, and after end 47 has moved a sufficient amount, the corner of armature 86 will be allowed to move underneath the slanting surface 85. The spring 87 is mounted on a laminated U-shaped core which is comprised of a number of individual plates 87'. These plates are positioned within a pair of U-shaped frame members 88 which project beyond the ends of plates 87'. The pins 89 serve to hold the plates 87' in position within frame members 88, and the complete core structure is secured to supporting member 4 by screws 90. The armature 86 is likewise laminated from a number of plates 91 which are held together by pins 92 and the armature has an opening for receiving shaft 93. This shaft passes completely through all plates 91, and the ends of the shaft are received by frame members 88 so that the armature 86 can pivot about shaft 93. A circular solenoid winding 94 is wound around an insulated supporting member 95, which has a circular center opening so that the solenid winding can be placed around one leg of the U-shaped core. The spring 87 is mounted on the same leg and is bent to continually urge the armature 86 away from the field of the solenoid winding. It is therefore apparent that when the winding 94 is energized, the armature 86 will be pulled toward the winding against the force of spring 87 and will be moved from underneath slanting surface 85 of end 47. The end 47 of arm 39 will therefore be allowed to return to its original position and completely uncage the gyroscope once the solenoid winding 94 has been energized. After this uncaging, the gyro will be free to control the movement of its mounting craft and it will have been brought up to speed by the power supply through the auxiliary contacts 22 and 68.

Figures 11, 12, 13:
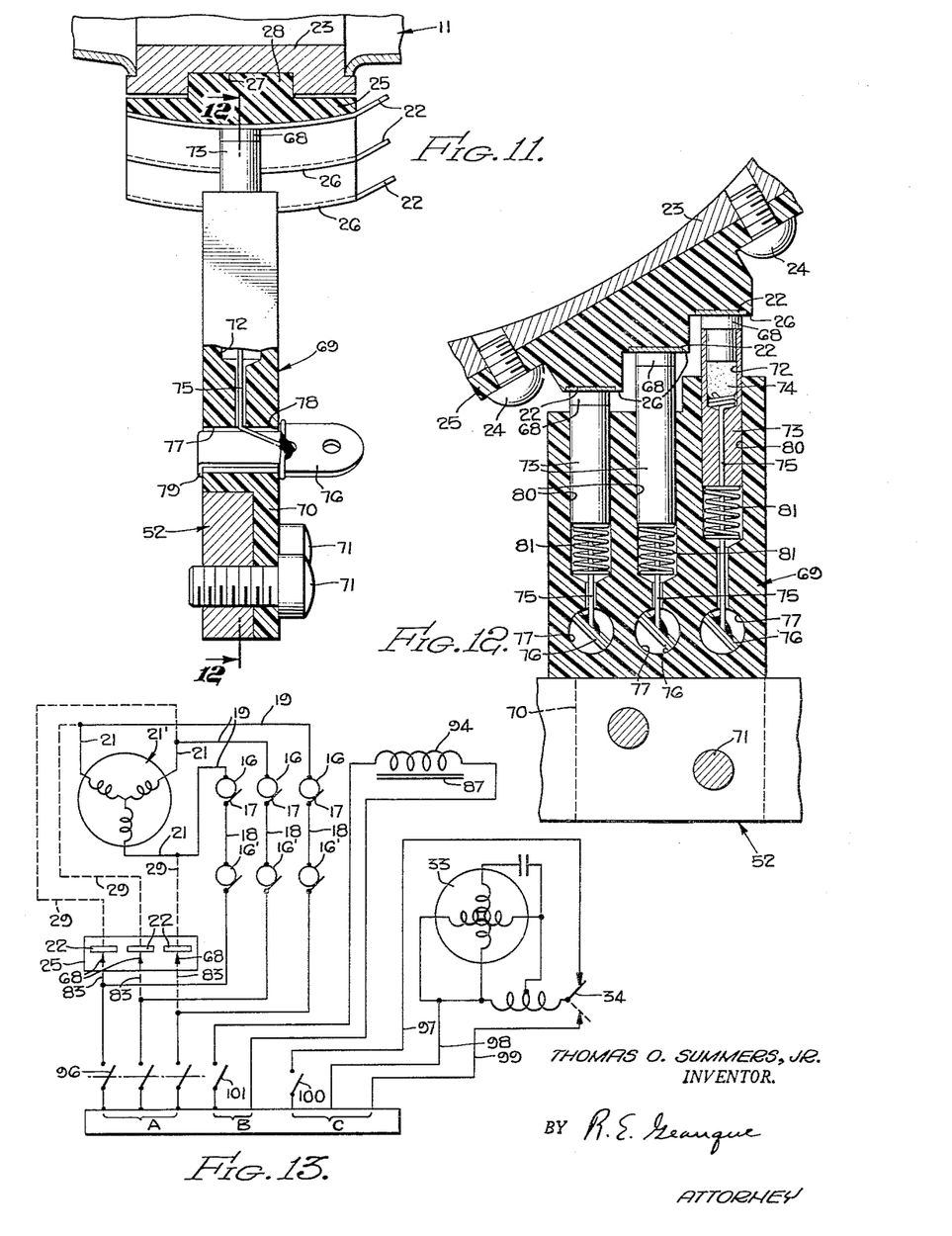
Fig. 11 is a cross sectional view of the auxiliary contacts taken along line 11—11 of Fig. 9.
Fig. 12 is a cross sectional view taken along line 12—12 of Fig. 11 showing the three auxiliary contacts on the caging arm in contact with the three auxiliary contacts on the inner gimbal.
Fig. 13 is a schematic wiring diagram showing the electrical circuit for the subject invention.

The complete operation of the gyroscope starting device of this invention can best be described in connection with the wiring diagram of Fig. 13. The three-phase power supply A is connected to leads 18 for the slip rings 16 and to leads 83 for contacts 68. The leads 19 connect the slip rings with the gyro motor 21', while leads 29 connect contacts 22 with the gyro motor. The manual switch 96 is closed when it is desired to start the gyro motor. The caging motor 33 is supplied with electrical energy from three-phase power source C through leads 97, 98 and 99. When it is desired to rotate disc 36 to cage the gyroscope, the switch 100 is manually closed and the motor 33 thereafter will continue to rotate as long as the switch 100 is closed. Once during each revolution of the motor, the plunger 38 of switch 34 will be actuated for a short interval and moved from its contact with lead 99 into contact with lead 97 as shown in Fig. 13. After the pin 37 passes plunger 38, switch 34 will move to its original position in contact with lead 99 and the motor will continue to operate. After the operator has given the motor sufficient time to move pin 37 away from plunger 38, he will release switch 100 and the motor will continue to operate until pin 37 again actuates switch 34 and moves it into contact with lead 97. Therefore, after switch 100 is opened, the motor will stop when pin 37 moves into contact with plunger 38 so that the disc 36 will always move to its uncaged position after switch 100 is released. During rotation of the disc 36, the end 47 of arm 39 has been moved through opening 48 and locked in caging position by armature 86. The solenoid winding 94 is connected to a suitable power source B through manual switch 101, which is normally open, and this switch is closed when it is desired to pull the armature away from slanting surface 85 and allow the end 47 to move back into its original position and thereby uncage the gyroscope.

At the time that a movable craft equipped with this invention is stored, the gyro will be caged by closing switch 100 for a sufficient time to allow disc 36 to move the end 47 of arm 39 into its caging position where it will be retained by armature 86. After switch 100 is open, the disc 36 will return to its original uncaged position and stop. When it is desired to quickly launch the movable craft, the switch 96 will be closed and power will be supplied to the gyro motor 21 through slip rings 16 and through contacts 68, 22 since the gyro is in its caged position. Because of the fact that auxiliary contacts 68 and 22 are heavy enough to carry large currents, the major portion of the power will be delivered to the motor through these contacts. After the motor has been brought up to speed, the switch 101 will be manually closed to energize solenoid winding 94, and this will result in armature 86 releasing end 47 of arm 39 so that arm 39 and caging arm 52 can return to their original uncaged position. The uncaging will break the connection between contacts 68 and 22, but since the gyro motor has been brought up to speed the motor will be continuously driven by a smaller amount of power supplied through slip rings 16 during movement of the mounting craft. Therefore the gyroscope of this invention can be normally retained in caged position and the motor quickly brought up to speed and the gyro uncaged upon very short notice of the necessity to launch the mounting craft.

It is understood that the invention is not limited to a particular caging device and auxiliary contacts which have been described, but broadly relates to caging devices which will quickly cage a gyroscope, and to auxiliary power sources which will supply a substantial amount of power to the gyro motor while it is in its caged position. Also, the caging device of this invention will operate to cage the gyro even though the gyro motor is running, and thus the auxiliary power circuit can be connected regardless of the operative condition of the gyroscope. Various modifications are contemplated and may obviously be resorted to by those skilled in the art, without departing from the spirit and scope of the invention, as hereinafter defined by the appended claims.

What is claimed is:

1. In a starting device for a gyroscope mounted on a movable craft, means selectively operable to move said gyroscope to caged position and thereafter lock said gyroscope in caged position, means for energizing the gyroscope in all of its positions relative to its mounting craft, and auxiliary means for energizing said gyro motor when said gyroscope is in its caged position.

2. In a starting device for a gyroscope mounted on a movable craft, means for universally mounting said gyroscope, force exerting means for moving said gyroscope into caged position relative to said mounting means, a power supply for continually operating said gyroscope, and an auxiliary power supply operative in addition to first-mentioned power supply to bring said gyroscope up to speed quickly after it is placed in caged position.

3. In a starting device for a gyroscope mounted on a movable craft, a gyroscope having inner and outer gimbal rings, power operated caging means for moving said inner and outer gimbal rings into caged position, a first set of electrical contacts carried by said inner gimbal, a second set of electrical contacts carried by said movable craft, and means responsive to the caging of said gimbal rings by said caging means for moving said second set of contacts into conducting relationship with said first set of contacts while said inner and outer gimbals are in their caged position.

4. A starting device for a gyroscope mounted on a movable craft comprising a motor for operating said gyroscope and inner and outer gimbal rings for universally supporting said gyroscope, force exerting means for selectively caging and uncaging said gyroscope, first means for supplying power to said motor through said outer gimbal axis, and auxiliary means for supplying power direct to said motor without passing through said outer gimbal axis when said gyroscope is in its caged position.

5. In a starting device for a gyroscope mounted on a movable craft, means for mounting said gyroscope including inner and outer gimbal rings, circuit means for continually energizing said gyroscope, means for moving said outer gimbal ring into its caged position while preventing precession of the gyro about the inner gimbal ring, means for moving said inner gimbal ring into its caged position after said outer gimbal ring has been caged and auxiliary circuit means for supplying electrical energy to said gyroscope after said inner and outer gimbal rings have been moved into their caged position.

6. In a starting device for a gyroscope mounted on a movable craft, force exerting caging means for selectively caging the gyroscope, a first set of contacts carried by said gyroscope and a second set of contacts mounted by said craft, means for moving said second set of contacts into conducting relationship with said first set of contacts after said gyroscope has been caged by said caging means, and means for moving said second set of contacts out of conducting relationship with said first set of contacts when said gyro is freed from said caging means.

7. In a caging device for a gyroscope supported by inner and outer gimbal rings, cam means secured to the inner gimbal and rotatable therewith, spring biased means exerting a force on said cam means for rotating said means and said outer gimbal to its caged position and for simultaneously holding said inner gimbal against precession, second means integral with the inner gimbal ring for rotation therewith, said spring biased means acting against said second means for moving the inner gimbal into its caged position after said outer gimbal ring is moved into its caged position and the inner gimbal released.

8. In a starting device for a gyroscope mounted on a movable craft, means for moving said gyroscope to a caged position and thereafter positively holding said gyroscope in caged position, an auxiliary power supply for said gyroscope, means operative by said caging means for connecting said auxiliary power supply to said gyroscope while the gyroscope is held in caged position, and means for releasing the gyroscope from said caging means and simultaneously disconnecting said auxiliary power supply.

9. In a starting device for a gyroscope universally mounted in a movable craft, a motor for driving said gyroscope, a first electrical circuit for supplying power to said gyroscope in all of its positions relative to said craft, means for moving said gyroscope to caged position and thereafter holding said gyroscope, and a second electrical circuit of lower resistance than said first circuit for supplying a large amount of electrical power to said gyroscope when in said caged position in order to quickly place the gyroscope in condition to control said craft.

10. In a starting device for a gyroscope, a gyro motor, an inner gimbal ring supported by an outer gimbal ring and carrying said motor, a first power circuit provided with slip rings to permit said circuit to pass through said outer gimbal axis and to said motor, said first circuit being capable of supplying sufficient power to rotate said motor after it is brought up to speed, means for moving said gyroscope to caged position and thereafter positively holding said gyroscope when it is desired to start said gyro motor, a second auxiliary power circuit having larger current carrying capacity than said first circuit and means for connecting said second circuit to said motor during the time said gyroscope is held in said caged position by said caging means.

11. In a starting device for a gyroscope, as set forth in claim 10, having means for releasing said caging device to free said gyroscope and for disconnecting said auxiliary power circuit.

12. In a starting device for a gyroscope mounted on a movable craft, a gyro motor, an inner gimbal ring supported by an outer gimbal ring and carrying said motor, means for caging said gyroscope by moving said inner and outer gimbals into caged position, means for locking said caging means to retain said gyroscope in caged position, means for unlocking said locking means to free the gyroscope of said caging means, a first power circuit provided with slip rings for normally supplying said gyro motor with electrical energy in all of its positions relative to said mounting craft, a second power circuit having larger current carrying capacity than said first circuit for supplying a large amount of electrical energy to said gyro motor, and means for connecting said second power circuit to said gyro motor when the gyroscope is caged and for disconnecting said second circuit when the gyroscope is freed by said unlocking means.

13. In a starting device for a gyroscope mounted on a movable craft, a gyro motor supported by inner and outer gimbals carried by said craft, means for caging said gyroscope by moving said inner and outer gimbals, means for locking said caging means to hold said gyroscope in caged position, means for unlocking said locking means to free said gyroscope of said locking means, auxiliary power means having large current carrying capacity for supplying an increased amount of electrical energy to said gyro motor, and means for connecting said auxiliary power means to said gyro motor while said gyroscope is held in caged position by said caging means and for disconnecting said auxiliary power means when said caging means is released by said unlocking means.

14. A starting device for a gyroscope mounted on a movable craft, comprising inner and outer gimbal rings for universally mounting said gyroscope, first and second camming means integrally connected with said inner and outer gimbal rings respectively for movement therewith, a caging arm mounting a roller for engaging with said second camming means and mounting a tapered, grooved member for engaging with said first camming means, means for moving said caging arm into caging position to cause said roller to cage said outer gimbal and said tapered, grooved member to cage said inner gimbal, means for locking said caging arm in its caging position, means for moving said caging arm out of caging position in order to free the gyroscope and a set of auxiliary contacts carried by said caging arm and forming a part of an auxiliary power circuit for said gyroscope to aid in starting said gyroscope, said auxiliary contacts being connected to said gyroscope when said caging arm moves into caging position and being disconnected from said gyoscope when said caging arm moves away from said caging position.

15. In a starting device for a gyroscope mounted by a movable craft, a first circuit for supplying electrical energy to said gyroscope in all of its positions relative to said craft, said first circuit containing resistances in the form of slip rings and small leads and having relatively small current carrying capacity, a second auxiliary power circuit having relatively large contacts and leads for supplying a relatively large amount of power to said gyroscope, caging means for selectively moving said gyroscope to caged position and thereafter locking said gyroscope against movement, and means operated by said caging means upon caging of said gyroscope for connecting said auxiliary circuit to said gyroscope.

16. A quick-starting gyroscope comprising a rotor mounted for displacement about two mutually perpendicular axes, first circuit means for normally energizing said gyroscope, caging means for moving said rotor about both said axes to caged position and thereafter locking said rotor against further movement, auxiliary circuit means for energizing said gyroscope to provide a large starting current, and means operable by said caging means to connect said auxiliary circuit to said gyroscope during the time said rotor is locked in caged position.

17. A quick-starting gyroscope for a movable craft comprising inner and outer gimbal rings for universally supporting the rotor and motor of said gyroscope, movable means for exerting a force upon both said gimbal rings to move said gyroscope to caged position and thereafter prevent further movement of said gimbal rings, first means for supplying energy to said motor through said outer gimbal axis, and auxiliary means for supplying energy directly to said motor without passing through said outer gimbal axis, said auxiliary means comprising a first set of contacts secured to said inner gimbal ring and a second set of contacts movable with said force exerting means to engage said first set upon caging of said gyroscope.

18. A quick-starting gyroscope comprising first and second gimbal rings for universally mounting said gyroscope, first circuit means for normally energizing said gyroscope, cam means carried by each of said gimbals, a spring biased caging arm operable first upon one of said cam means and then upon the other to move first one gimbal and then the other into caged position, means operable by said caging arm to hold said other gimbal while said one gimbal is being moved to caged position, said caging arm locking each gimbal after it is moved to caged position, and an auxiliary circuit means for said gyroscope having contacts carried by said caging arm and movable into connection with said gyroscope by said caging arm after both gimbals have been moved to caged position.

19. A quick-starting gyroscope comprising a rotor supported by inner and outer gimbal rings for universal movement, first cam means carried by said outer gimbal and having a slot therein, second cam means carried by said inner gimbal, a caging arm carrying a roller for engaging said first cam means and carrying a camming surface for engaging said second cam means, said caging arm being mounted for movement toward and away from both said cam means, spring means for selectively biasing said caging arm toward both said cam means to cause said roller to rotate said first cam means and said outer gimbal until said roller enters said slot at which time said outer gimbal is locked in caged position, brake means operable by the force of said roller on said first cam means to hold said inner gimbal while said outer gimbal is being caged, said spring means urging said camming surface into contact with said second cam means after said roller enters said slot to thereby rotate said inner gimbal into caged position.

20. A gyroscope as defined in claim 19 having a first circuit for normally energizing said gyroscope in all of its positions, and a second starting circuit having a first set of contacts mounted on said inner gimbal and a second set of contacts carried by said caging arm and movable into contact with said first set upon movement of said caging arm into position to cage both gimbals.

References Cited in the file of this patent

UNITED STATES PATENTS

| | | |
|---|---|---|
| 1,192,468 | Shonnard | July 25, 1916 |
| 2,591,741 | Stone | Apr. 8, 1952 |
| 2,641,133 | Barkalow et al. | June 9, 1953 |
| 2,645,129 | Brown | July 14, 1953 |
| 2,694,314 | Konet et al. | Nov. 16, 1954 |